March 10, 1959     W. P. OEHLER ET AL     2,877,064
BEARING CONSTRUCTION

Filed Nov. 12, 1953     2 Sheets-Sheet 1

INVENTORS.
WILLIAM P. OEHLER
CHARLES H. YOUNGBERG
BY
ATTORNEYS

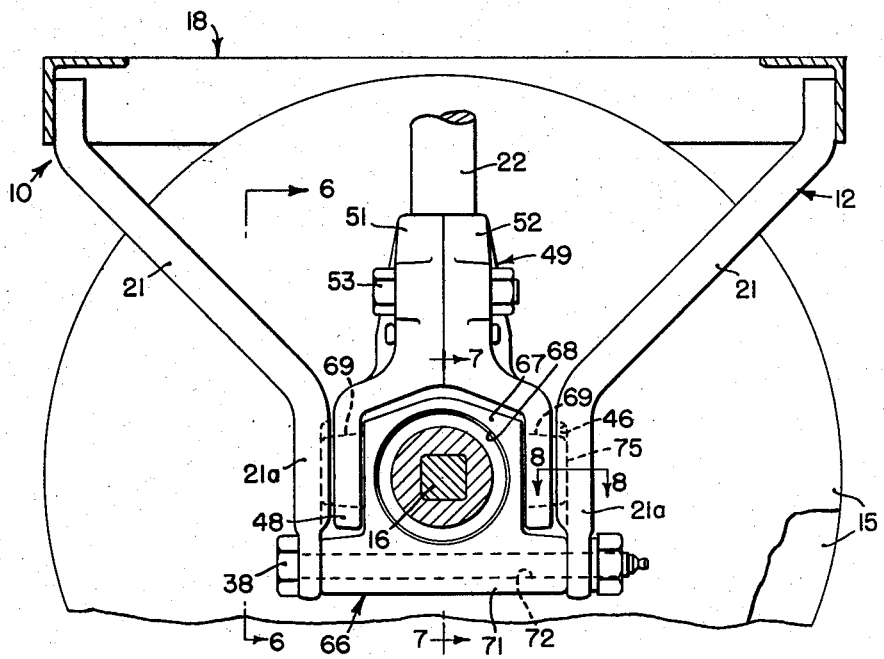
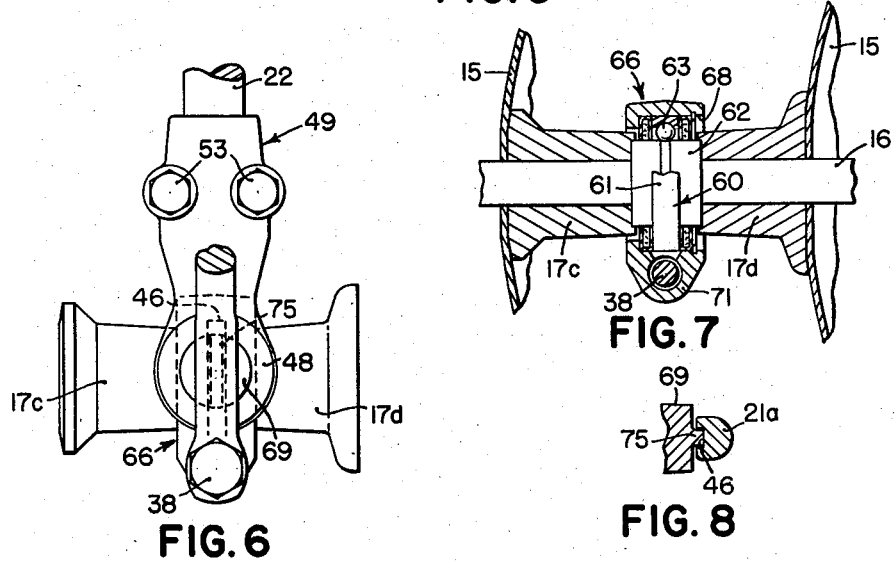

United States Patent Office 2,877,064
Patented Mar. 10, 1959

2,877,064

BEARING CONSTRUCTION

William P. Oehler and Charles H. Youngberg, Moline, Ill., assignors, by mesne assignments, to Deere & Company, a corporation of Delaware Application November 12, 1953, Serial No. 391,478

3 Claims. (Cl. 308—19)

The present invention relates generally to agricultural implements and more particularly to implements such as disk harrows and the like.

The object and general nature of the present invention is the provision of a new and improved bearing construction for disk harrows and the like, wherein means is provided for accommodating either of two types of anti-friction means, such as, for example, either a roller or ball bearing unit or a white iron bearing unit. In either case, according to the principles of the present invention, the bearing construction is such as to properly receive and support on the disk gang the associated gang frame and main frame, with the bearing construction and associated parts held rigidly in proper operative relation, irrespective of the type of anti-friction bearing means employed.

These and other objects and advantages of the present invention will be apparent to those skilled in the art after a consideration of the following detailed description, taken in conjunction with the accompanying drawings, in which:

Fig. 5 is a view similar to Fig. 1 showing a modified form of construction in which a ball bearing unit is employed in place of the plain type of bearing unit shown in Figs. 1 and 3.

Fig. 6 is a view taken generally along the line 6—6 of Fig. 5.

Fig. 7 is a sectional view taken generally along the line 7—7 of Fig. 5.

Fig. 8 is a sectional view taken along the line 8—8 of Fig. 5.

Figure 1:
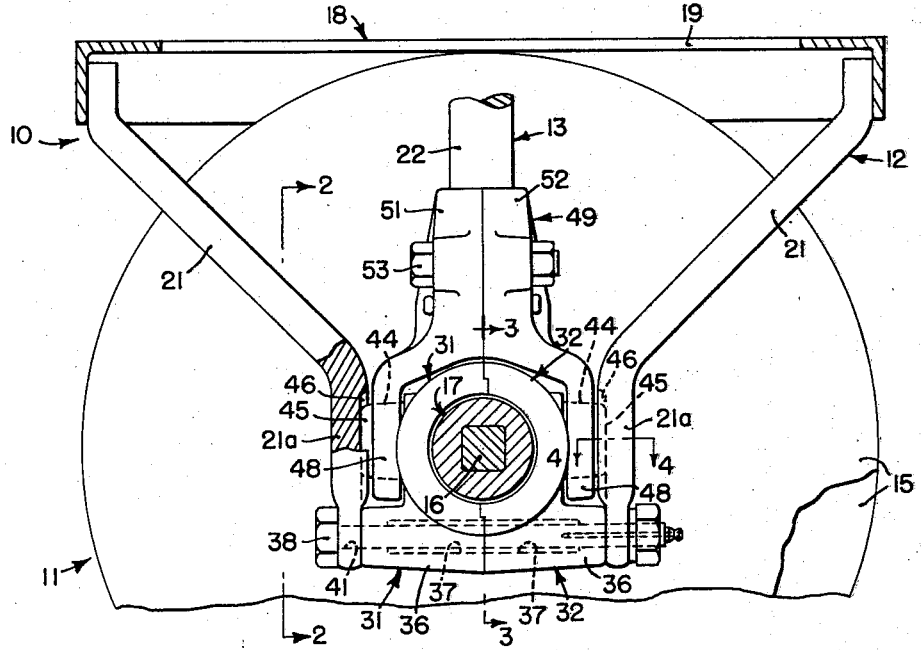
Fig. 1 is a generally vertical section, taken through a disk gang and the associated frame structures, the bearing means shown in this form of the invention being of the type commonly known as a plain bearing, the contacting bearing surfaces being in the form of white iron castings.

Referring first to Fig. 1, the present invention is shown as incorporated, by way of example, in a disk harrow 10 of the type that includes a disk gang 11, a gang frame 12 carried thereby, and an associated main frame 13. The disk gang comprises a plurality of ground-working disks 15 mounted on a gang bolt 16 and maintained in properly spaced apart relation by spacing spools indicated generally at 17. The disk gang frame 12 comprises an upper generally rectangular structure 18, usually formed of angle bars 19, and associated depending braces or standards 21 securely fixed at their upper ends, as by welding, to the frame 18. The main frame 13 is substantially the same as the main frame shown in the U. S. patent to White 2,339,124, dated Januuary 11, 1944, and includes, for each gang, a downwardly extending spindle portion 22.

The present invention relates generally to the bearing construction by which the main frame and disk gang frame are supported on the rotatable disk gang.

Figure 2:
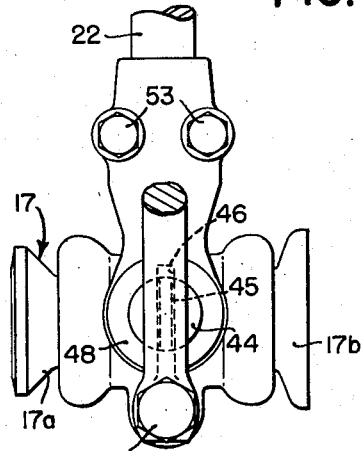
Fig. 2 is a sectional view taken generally along the line 2—2 of Fig. 1.
Figure 3:
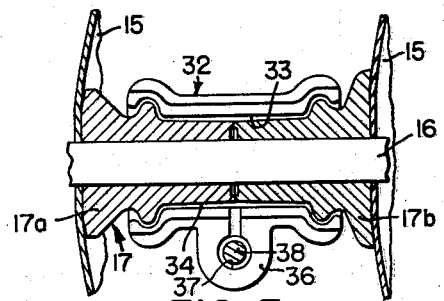
Fig. 3 is a fragmentary sectional view taken generally along the line 3—3 of Fig. 1.
Figure 4:
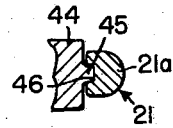
Fig. 4 is a sectional view taken along the line 4—4 of Fig. 1.

The bearing construction shown in Figs. 1–3 includes a pair of bearing sleeve sections 31 and 32 that, when assembled as shown in Fig. 1, form an interior generally cylindrical bearing surface 33. Each bearing sleeve means 31, 32 receives and cooperates with the two spacing spool sections 17a and 17b that, as best shown in Fig. 3, are mounted on the gang shaft 16 and, taken together, form an exteriorly facing cooperating bearing surface 34. Each of the bearing sleeve sections 31 and 32 is formed with a lower transversely apertured boss or extension 36, the apertures 37 of which are disposed in alignment with one another when the bearing sleeve sections are in position, and through the apertures 37 a clamping means in the form of a bolt 38 is disposed.

The lower portions of the gang frame standards 21 are formed as vertically arranged sections 21a, the lower ends of which are apertured, as at 41, to receive the ends of the associated bolt 38. The outer ends or boss sections of the apertured bearing sleeve portions 36 are flat and abuttingly receive the lower apertured ends of the gang frame standards 21 when the bolt 38 is tightened.

Formed on each of the bearing sleeve sections 31 and 32, above the transversely apertured portions 36, are laterally outwardly extending, generally cylindrical bosses or projections 44, and the laterally outer end of each of the bosses 44 is provided with a vertical rib 45 that is snugly received in a vertical notch or slot 46 formed in the associated portion of the lower end portion of the gang frame standard 21. The gang frame standards 21 are so formed that the end portions flare outwardly and downwardly a slight amount before assembly of the associated parts, but when the bolt 38 is tightened the lower end portion 21a extends downwardly generally in parallelism and embraces and abuts against the laterally outer ends of the upper bosses 44 and the lower bosses or apertured portions 36 of the associated bearing box that is formed by the two bearing sleeve sections 31 and 32. By so forming the standards 21 that they initially have a certain amount, although small, of flare, when the bolt 38 is tightened the standards are brought firmly and positively into engagement with the outer or ribbed ends of the bosses 44, with the result that while only one bolt 38 is employed, the two bearing halves 31 and 32 are each contacted at two points by a clamping means and thus firmly and positively held in assembled relation about the associated spacing spool sections 17a and 17b.

It will be noted from Fig. 1 that the bosses 44 extend generally laterally outwardly approximately in transverse alignment and that the common axis of said bosses 44 passes approximately through the center of the bearing unit. Further, Fig. 1 clearly shows that the bottom portions of the notches 46 lie substantially flush with or in substantially the same vertical plane as the inner faces of the lower bolt-receiving ends of the lower standard portions 21a, and that the notches 46 thus provide for bringing the gang frames into proper position during assembly by moving the standards 21 generally vertically downwardly along the ribs 45 until the lower ends of the standard portions 21a are in a position to receive the clamping bolt 38.

It will also be noted from Fig. 1 that the boss sections 44 receive the two lower portions 48 of the bifurcated yoke member 49, the upper portion of which is formed as a sleeve and rotatably receives the lower end of the main frame spindle 22. From Fig. 1 it will be seen that the ribs 45 extend laterally outwardly of the outer portions of the yoke member 49 a distance slightly in excess of the depth of the notches 46 whereby the yoke member 49 is freely swingable on the bosses 44. Preferably, the yoke member 49 is made up of two mating parts 51 and 52, which may be identical if desired, the two parts being held in assembled relation by a plurality of clamping bolts 53. There is sufficient space between the inner faces of the standard section 21a and the upper portion of the associated bearing box to accommodate rocking of the yoke member 49 and associated main frame spindle 22 relative to the gang frame bearing.

According to the principles of the present invention the white iron bearing construction, which includes principally the sleeve sections 31 and 32 and the spacing spool sections 17a and 17b, may be replaced, if desired, by a bearing construction which includes anti-friction bearing means in the form of a ball bearing unit 60 that may comprise an outer race 61 and an inner race 62 and associated balls 63, together with suitable sealing and retaining means. The spacing spool sections 17a and 17b are replaced by a pair of spacing spool sections 17c and 17d (Fig. 7), these sections being so formed that the inner ends receive the inner bearing race member 62, which is longer in an axial direction than the outer bearing race 61. When the gang bolt 16 is tightened, the spacing spool sections 17c and 17d are clamped firmly against the ends of the inner bearing race 62.

Also, in this form of the invention, the two bearing sleeve halves 31 and 32 are replaced by an integral or one-piece bearing box member 66 that includes an upper section 67 having a relatively large bearing-receiving aperture 68 therein, the apertured portion 68 carrying means to receive the outer bearing race 61. This portion of the bearing box member 66 is provided with outwardly extending, generally cylindrical bosses 69 that dimensionally are substantially identical with the bosses 44 described above, the bosses 69 receiving the lower portions 48 of the frame-receiving yoke member 49 for rocking movement relative to the bearing box about an axis that extends substantially through the axis of the gang shaft 16.

The lower portion of the bearing box member 66 is provided with an extension 71 that is provided with a through opening 72 that is adapted to receive the clamping bolt 38. In this form of the invention just set forth the form of the invention described above, the lower ends 21a of the gang frame standards 21 are clamped or fixed rigidly to the lower portion of the bearing box structure 66 by the clamping bolt 38, the standards 21 being so formed that by tightening the bolt 38, the slotted or notched portions 46 of the standards are firmly and rigidly held against the ribs 75 that are formed on the outer faces of the bosses 69 and dimensionally are identical with the ribs 45 described above.

From the above description, it will be seen that a disk harrow may be constructed so as to have either white iron bearings or ball or roller bearings, as desired, with only a few extra parts necessary to provide the optional arrangement. Similarly, changeovers may be made in the field, where desired, by interchanging only a relatively few parts.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In a disk harrow or the like, a frame, a pair of standards connected at their upper ends with said frame, and a bearing construction comprising a bearing box having means forming a lower transverse portion provided with a through opening and a pair of generally cylindrical bosses disposed above said transverse portion, a clamping bolt extending through said opening, a frame-receiving bifurcated yoke having spaced apart portions embracing said bearing box and receiving and movable relative to said bosses, thereby accommodating pivotal movement of said yoke relative to said bearing box, said spaced apart yoke portions being separable and each including an apertured part adapted to snugly receive the associated yoke-receiving boss and to be passed over the outer end thereof into position thereon, the lower portions of said standards embracing said yoke and said bearing box and receiving said clamping bolt, and interengaging means on the outer ends of said cylindrical bosses and portions of said standards above the lower ends thereof for connecting said standards to said bosses, said interengaging means comprising a generally vertical rib on the laterally outer end of each of said bosses and integral therewith, said rib extending laterally outwardly beyond the associated yoke portion that is pivotally mounted on said boss and having its ends extending no farther than the extended exterior generally cylindrical surface of the boss, whereby the rib accommodates application or removal of the associated boss-receiving yoke part, and a rib-receiving vertically extending notch in the lower end portion of each standard, the depth of each notch being less than the distance the associated rib extends laterally outwardly beyond the associated yoke portion, whereby the yoke is freely swingable on the associated cylindrical bosses after tightening of the clamping bolt serves to fix said standards to said bearing box and hold said ribs in the associated notches.

2. The invention set forth in claim 1, further characterized by the inner faces at the lower ends of the standards lying in planes substantially coinciding with the bottom portions of said notches whereby the standards may be brought into engagement with said ribs by virtue of downward movement of said standards relative to said cylindrical bosses.

3. The invention set forth in claim 1, further characterized by said bearing box comprising a pair of bearing sleeve sections separable along a generally vertical plane extending through the axis of the bearing, and means forming on said sleeve sections said lower transverse portion and said generally cylindrical bosses

References Cited in the file of this patent

UNITED STATES PATENTS

| | | |
|---|---|---|
| 1,480,161 | Ford | Jan. 8, 1924 |
| 2,097,244 | Sjogren et al. | Oct. 26, 1937 |
| 2,247,685 | Hipple | July 1, 1941 |
| 2,644,388 | Oehler | July 7, 1953 |
| 2,693,748 | Kiser | Nov. 9, 1954 |